United States Patent [19]

Fassauer

[11] Patent Number: 5,263,304
[45] Date of Patent: Nov. 23, 1993

[54] AIR-FLOATED WHEELED APPARATUS

[76] Inventor: Arthur L. Fassauer, P.O. Box 124, Canyon, Tex. 79015

[21] Appl. No.: 700,483

[22] Filed: May 15, 1991

Related U.S. Application Data

[63] Continuation-in-part of Ser. No. 528,718, May 24, 1990.

[51] Int. Cl.⁵ .......................................... A01D 87/00
[52] U.S. Cl. ...................................... 56/12.8
[58] Field of Search .............. 56/12.8, 12.9, 13.1–13.4, 56/16.7, 17.1; 15/300.1–306.1, 312.1, 312.2

[56] References Cited

U.S. PATENT DOCUMENTS 5,048,275 9/1991 Fassauer ............................. 56/12.8
5,101,615 4/1992 Fassauer ............................. 56/12.8

*Primary Examiner*—Thuy M. Bui
*Attorney, Agent, or Firm*—Ross, Howison, Clapp & Korn

[57] ABSTRACT

The present invention describes an air-floated apparatus for use as a lawn mower or vacuum cleaner. In one embodiment, the apparatus comprises a housing having an outer shroud and an inner shroud, the outer shroud surrounding a predetermined portion of the inner shroud to define a pressure chamber between the inner and outer shrouds and a vacuum chamber within the inner shroud. A drive mechanism includes a motor having a rotatable shaft. A single impeller is supported in the pressure chamber and rotates on the shaft for exhausting air from the vacuum chamber to erect grass underlying the opening while simultaneously pressurizing air in the pressure chamber to float the apparatus above the grass. Airborne cut grass clippings are vacuumed into and through the impeller for distribution into the soil for recycle and recut. According to the invention, an adjustment assembly is provided for adjusting a position of the housing relative to a center-line auxiliary wheel assembly. The air-floated wheeled apparatus may include an edger and a trimmer.

15 Claims, 6 Drawing Sheets

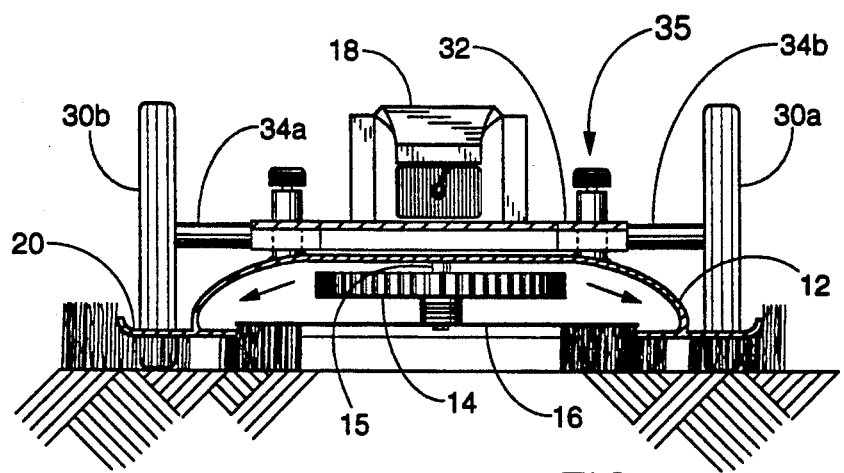
FIG. 3
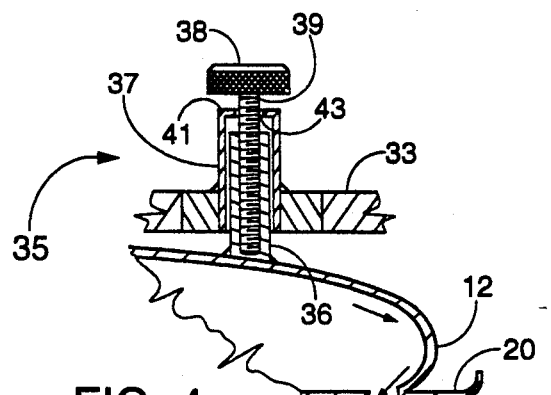
FIG. 4
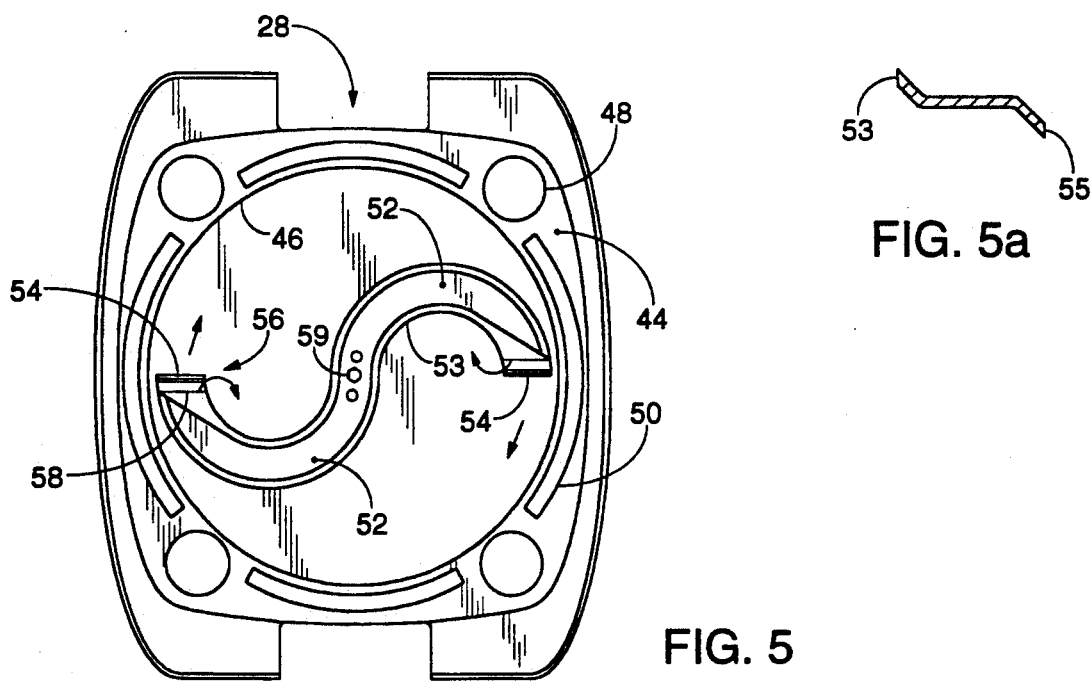
FIG. 5a
FIG. 5

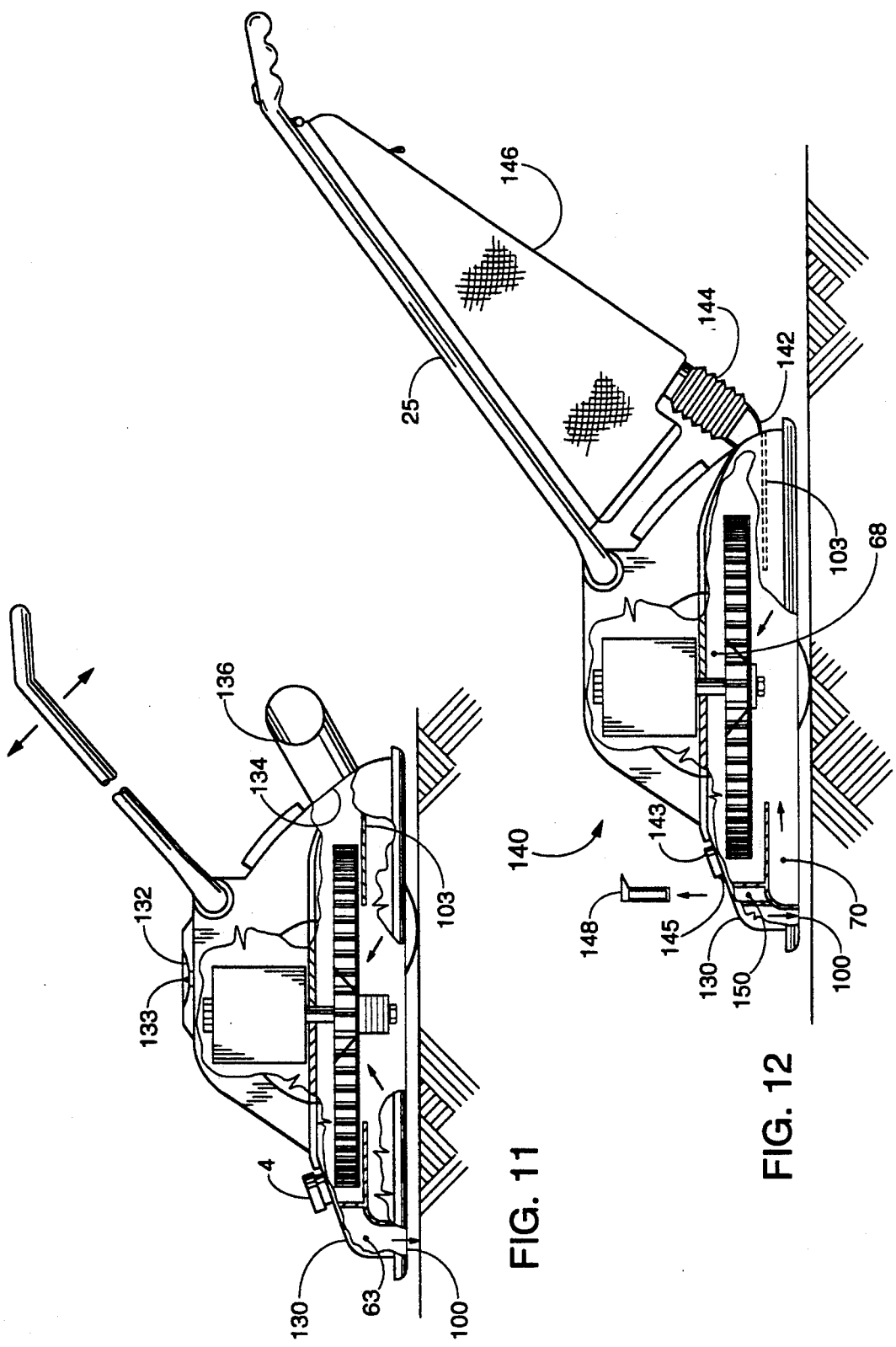

AIR-FLOATED WHEELED APPARATUS

This application is a continuation-in-part of prior copending application Ser. No. 07/528,718, filed May 24, 1990.

TECHNICAL FIELD

The present invention relates generally to an air-floated apparatus, such as a lawn mower or vacuum cleaner, that floats on an air cushion during operation and that includes an auxiliary center-line wheel mechanism for enhancing stability and maneuverability.

BACKGROUND OF THE INVENTION

It is known in the prior art to provide an air-supported or "hover" apparatus for use as a lawn mower. Generally, such devices include a substantially-enclosed housing and means for generating air pressure within the housing to provide an air cushion to float the housing over a support surface. Examples of such devices are shown in U.S. Pat. Nos. 3,170,276, 3,293,836 and 4,245,455, and U.K. Patent Specification No. 1,534,021

While air-floated devices of the prior art have significant advantages over conventional wheeled products, such devices have certain inherent problems which have yet to be overcome. In particular, such devices typically include an outer housing having a narrow peripheral edge, bezel or seal. During operation, air blown toward the ground by the air pressure means tends to escape from the housing between the ground an the narrow edge structure, which substantially reduces the lifting force on the housing. The rapid escape of air along the periphery of the mower housing also stirs up dust and debris when mowing around shrubbery and the like, which makes mowing difficult and hazardous. Also, because the air is blown downward to keep the housing afloat, the air pressure depresses the grass, causing the cutting blade [o leave an uneven cut. Other problems include the inability to maintain lateral or side-to-side stability of the device.

Another disadvantage of prior art air-cushioned mowers is their inability to discharge grass cuttings, which leaves a windrow of cuttings that must be raked up after mowing. Conventional lawn mowers tend to vacuum up grass by the rotary action of the cutting blade. In prior art air-cushioned mowers, however, downwardly blown air pressure used to create the lifting force by ground effect is not sufficient to effectively discharge grass cuttings. In other words, prior art air-cushioned mowers have not been able to maintain adequate flotation while simultaneously discharging grass clippings from a port.

It is known in the prior art to provide a hover-type apparatus in which air is recycled by the suction side of the impeller used to float the housing. One such system is shown in FIG. 5 of U.S. Pat. No. 4,738,086 to Dunn. A similar teaching is shown in FIG. 2 of U.S. Pat. No. 4,361,001 to Almond, et al. While such systems have some advantages, they do not solve the above-identified problems. Moreover, these systems teach only recycling of air; the clippings themselves are not recycled.

It would therefore be desirable to provide an improved air-floated apparatus that overcomes these and other problems associated with the prior art.

BRIEF SUMMARY OF THE INVENTION

It is an object of the present invention to provide an air-floated apparatus, such as a lawn mower or vacuum cleaner, that floats on an air cushion during operation and which includes an auxiliary center-line (or substantially center-line) wheel assembly for enhancing stability and maneuverability of the apparatus.

It is still a further object of the invention to describe such an air-floated apparatus that is simple to construct, has few moving parts and which is easy to maintain.

It is another object of the invention to provide an air-floated apparatus that includes an inverted impeller to simultaneously float the apparatus and to create a vacuum chamber within the housing of the apparatus. The wheel assembly helps counteract the vacuum that might otherwise pull the housing downward.

It is still another object of the invention to provide an air-floated apparatus that has a novel mulching blade assembly. The mulching blade has an S-shape formed from a pair of semi-circular arms or a serpentine shape formed from at least three (3) such arms having a common center. Each arm has a removable forward cutting tip and a diverter surface for facilitating the inward conveyance of cut grass clippings for even distribution into the soil area. According to the invention, the mulching blade effects multiple recutting and inward and downward conveyance of the clippings as the mower is advanced in the forward direction to achieve a fine mulch.

It is yet a further object to provide a "hover" apparatus which includes a center-line auxiliary wheel assembly whose level is adjustable relative to the main housing of the air-floated apparatus.

It is still a further object to provide an air-floated mower apparatus that includes a trimmer and edger such that the operator can trim and/or edge simultaneously during mowing of the lawn.

It is another object to provide a mower having a novel handle assembly in which each arm of the handle has a tightly-wound coil spring to enable the handle to flex up or down depending on the operator's height. This handle construction also insures that the level of the housing remains level during use.

It is yet a further object to provide an air-floated mower apparatus that includes an integral edger and trimmer.

These and other objects of the invention are provided in an apparatus comprising:

a housing including an impeller for establishing an air cushion to float the housing above a support surface, the housing having a predetermined center-line;

a wheel assembly having at least first and second wheels wheel contacting the support surface, the wheel assembly positioned over a portion of the housing and oriented along the predetermined center-line; and means supported by the housing and the wheel assembly to enable the housing to be carried by the wheel assembly when the impeller is not activated to float the housing and to enable the housing to float up into the wheel assembly when the impeller is activated to float the housing.

When the apparatus is configured as a lawn mower, the apparatus also includes a blade assembly preferably comprising an S-shaped or serpentine-shaped mulching blade. The apparatus is also configurable as a vacuum cleaner.

In an alternate embodiment, the apparatus embodiment comprises a housing that incorporates airtight molded enclosures in which the wheels of the center-line wheel assembly are received. The housing has an outer shroud and an inner structural frame, the outer shroud surrounding the frame to define a pressure chamber between the frame and outer shrouds and a vacuum chamber within the frame. The outer shroud includes the molded wheel enclosures. An impeller is supported in the pressure chamber and rotatable on a motor-driven shaft for exhausting air from the vacuum chamber while simultaneously pressurizing air in the pressure chamber to float the apparatus. Means are provided for positioning the housing relative to the wheel assembly and for automatically leveling the housing with respect to the terrain upon activation of the impeller.

In this embodiment, the wheel assembly is mounted along the center-line of the housing or aft thereof. The positioning means includes an adjustment module fixed to the shaft of each wheel, the adjustment module having a threaded shaft received in a knurled adjustment knob. The knob is supported above the molded enclosure in the housing in which the wheel and adjustment module are received.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 3 is a cross-section view of the apparatus taken along line 3—3' of FIG. 2;

FIG. 4 is a detailed cross-section view of the adjustment means of the apparatus of FIG. 2;

FIG. 5 is a bottom view of the preferred glide plate and cutting blade structures for use in the apparatus of FIG. 2;

FIG. 5A is a cross-sectional view of the mulching blade of FIG. 5;

FIG. 11 a detailed side view, partially cutaway, of the apparatus of FIG. 10;

FIG. 12 is yet another alternate embodiment of the apparatus of FIGS. 6–7 for use as an air-floated vacuum cleaner apparatus;

Similar reference characters refer to similar parts throughout the several views of the drawings.

DETAILED DESCRIPTION

Figure 1:
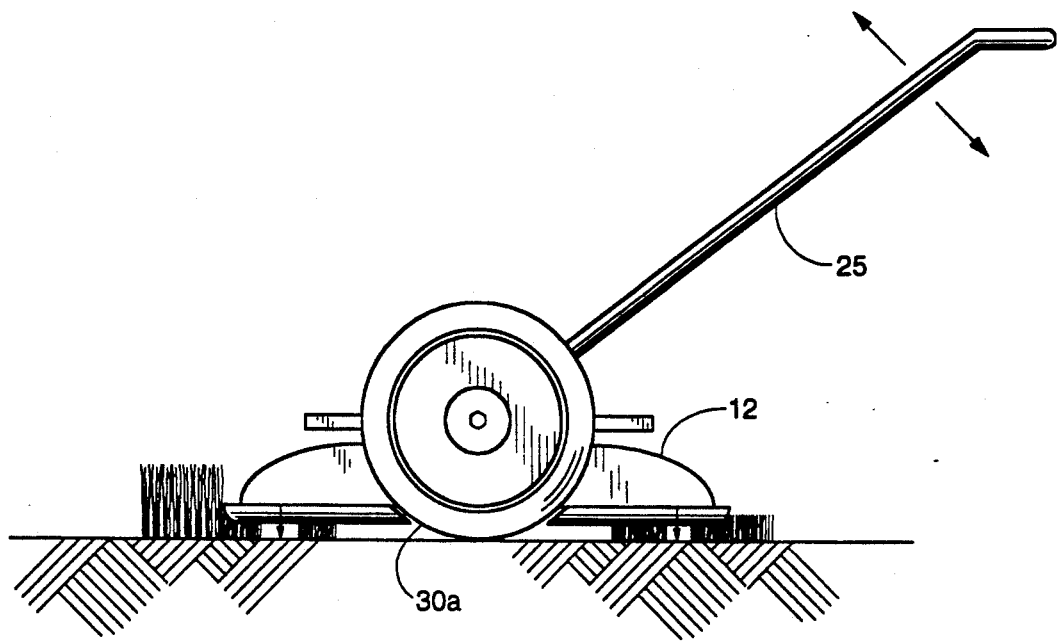
FIG. 1 is an elevational view of an air-floated apparatus according to the present invention.
Figure 2:
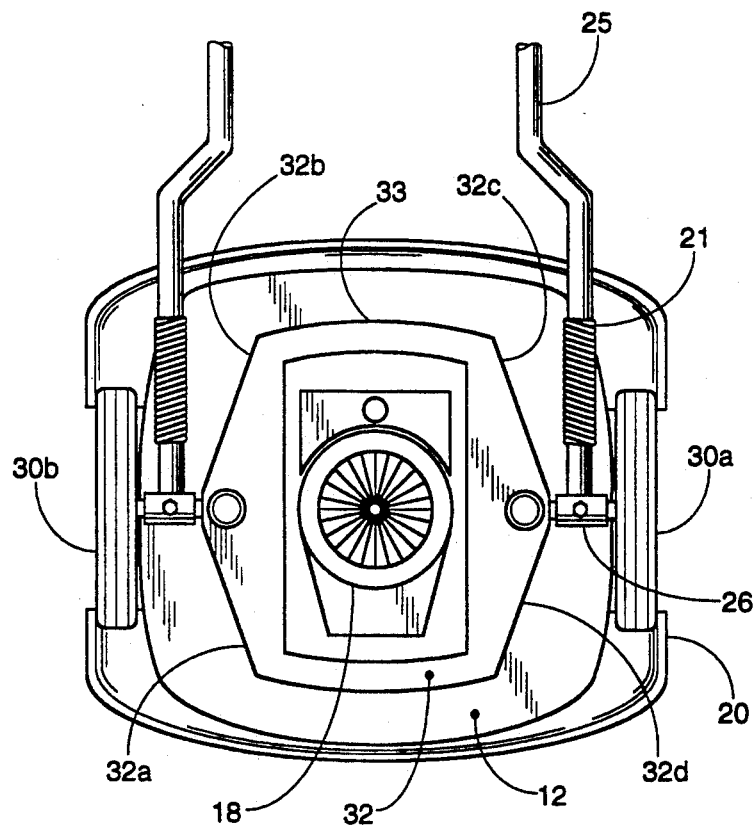
FIG. 2 is a plan view of the air-floated apparatus of FIG. 1.

Referring now to FIGS. 1–3, there is shown an air-floated apparatus 10 for use as a rotary lawn mower. Air-floated apparatus 10 includes a housing 12 in which a rotary air impeller 14 and a rotary cutting blade 16 are mounted on drive shaft 15 for common rotation by a power source 18. Power source 18 is operatively mounted on top of housing 12 in a generally central location by conventional fastening means (not shown). Power source 18 can be an AC or DC electric motor or, alternatively, a conventional lawn mower gasoline engine.

Housing 12 is generally trapezoidal in shape and is preferably made of plastic formed by an injection molding process to provide a lightweight housing. A deck member 20 is formed with the housing and, as best seen in FIG. 2, extends outwardly substantially around the entire bottom part of housing 12. The deck member 20 is curved upwardly and outwardly along its outer periphery to facilitate the gliding of the housing over the ground. The deck also functions as a sealant means to prevent escape of pressurized air. Housing 12 has a plurality of air intake openings 22 located in a top part thereof and a substantially open bottom. A handle 25 is secured in a collar joint 26 to respective opposite sides of the housing 12 to allow a user to control movement of lawn mower 10. Each arm of the handle 25 includes a tightly-wound extension-type spring coil 21 to enable the upper portion of the handle to flex up or down with respect to the fixed portions of the handle between the coils and the collar joints 26. Thus the handle is adjustable as to the height of the operator at the spring coils 21 themselves instead of at the positions where the handle ends physically contact the housing (i.e., the collar joints). This structure is much more advantageous than prior art handle constructions that are generally fixed to the housing. Of course, the spring coiled handle is also useful in conventional wheeled mowers.

Deck member 20 has cutout portions 28 (best seen in FIG. 5) on opposite sides of the housing in which are received a pair of wheels 30a and 30b mounted on such respective opposite sides of the housing 12. The housing includes a center-line "CL" which generally is located along a plane passing through the center-of-gravity (cg) of the unit. A typical air-floated housing is symmetrical and therefore the CL is generally positioned at a medial point of the housing when viewed in profile. As will be described, the CL may also be aft of the actual medial point of the housing without departing from the spirit of the invention.

With reference to FIG. 2, a structural frame member 32 of a wheel assembly extends over the housing and includes a cutout portion 33 through which the motor 18 upwardly projects. Viewed from the top, the frame member 32 has a generally truncated oval shape formed by edges 32a, 32b, 32c and 32d. The wheel assembly also includes the wheels 30. The frame member 32 has a central axis from which first and second shafts 34a and 34b project at each end thereof. Each shaft 34 includes an appropriate bearing mechanism (not shown) for supporting one of the wheels 30 in a conventional manner. The frame member 32 is not attached to the housing 12; rather, at least a portion of the housing is located below the frame member. According to the invention, the housing and the frame member include adjustment means 35 to enable the housing to be carried by the wheel assembly when the impeller is not activated to float the housing and to enable the housing to float up into the wheel assembly when the impeller is activated to float the housing.

Referring now to FIG. 4, a detailed sectional view is shown of one of the adjustment means 35 supported on the frame member 32. Each adjustment means 35 includes a post 36 secured or affixed to or otherwise molded with the outer surface of the housing 12. The frame member 32 includes an integral ring module 33 which supports an adjustment module 37 of the adjustment means. The module 37 has a hollow interior for receiving the post 36 for vertical movement during flotation as will be described. The adjustment means 35 further includes a knurled knob 38 having a threaded shaft 39 supported in the module 37. The threaded shaft 39 is received in the post 36 substantially as shown. The adjustment module 37 includes a top edge 41 having an opening 43 whose diameter is larger than the diameter of the threaded shaft 39; thus the shaft 39 moves freely up and down with respect to the module 37.

When the apparatus is stored or being moved into position for cutting the lawn, the housing 12 drops downward by gravity but is prevented from striking the ground by the top edge 41 of the module 37, which serves to retain the knob 38 against downward movement. When it is desired to set the depth of cut, the knob 38 is turned to thereby vary the relative initial position of the post 36 within the module 37 and to define the maximum upward movement of the housing relative to the frame member 32 (whose height above the ground is fixed by the wheel diameter). Alternatively, one or more spacers 31 are added or omitted to alter the horizontal cutting position. Thereafter, the mower is actuated and the housing 12 floats up into the wheeled frame member assembly limited only by the set position.

The air-floated apparatus of FIGS. 1-4 has numerous advantages. The center-line wheel assembly, in combination with the air-floated deck housing, significantly enhances the gliding maneuverability of the apparatus and increases stability, especially when the mower is used adjacent walls or shrubbery. The apparatus is simple to transport from storage due to the wheeled support. Although wheels are provided, the apparatus relies on the hovering operation to actually cut the grass. The depth of cut is readily controllable through use of a simple adjustment mechanism. The handle itself includes a pair of coiled springs to enable flexing of the handle at a point away from the point at which the handle is physically attached to the housing. This handle construction is especially useful as the housing floats relative to the fixed frame member/wheel assembly. In use, the unit is stable and simple to operate, and it provides a firm and even cut of the grass under many different types of operating conditions.

While the adjustment means of FIG. 4 is preferred, it should be appreciated that other suitable mechanisms or assemblies are also useful for supporting the air-floated housing relative to the wheeled-frame member assembly and/or for adjusting the relative positions of these elements. For example, post 36 may support a molded ball joint, in which case adjustment module 37 would include a corresponding socket joint for the ball joint. Such a construction enables adjustment of the housing upon initiation of flotation by insuring that the housing floats evenly with respect to the terrain.

Referring now to FIG. 5, a bottom view is shown of the preferred construction of the glide plate 44 and rotary cutting blade 16 of the apparatus of FIGS. 1-5. The glide plate 44 is molded with or otherwise separately attached to the bottom peripheral edge of the housing 12 and extends laterally-inward to form a circular opening 46. The glide plate 44 has preferably four (4) air ports 48 symmetrically-located at the corners of the plate member 44. Preferably, the plate member 44 includes an arcuate air slot 50 in between each pair of ports 48. Referring simultaneously to FIGS. 4-5, the pressurized air is directed downwardly and inwardly by the curved housing 12. A portion of the pressurized air is forced out from the ports 48 to lift the housing 12 into the frame member 32. Portions of the air are also directed through the slots 50 and form a semi-ground effect cushion underlying the plate member 44 and the outer deck 20. The slots 50 create a laminar air flow in and through the area of the plate member 44 adjacent thereto to provide maximum yet stable lift.

As also seen in FIG. 5, the blade member 16 is generally S-shaped and includes a novel mulching structure. Each arm 52 of the blade 16 has a semi-circular shape and includes a forward preferably "snap-on" cutting tip 54 at its distal end 56. When the tip is dulled through use, it is removed and replaced with a new tip that is snapped onto the distal end of the arm 52. Each arm further includes a diverter 58 adjacent the cutting tip 54 that functions to collect and move the cuttings inwardly toward the center 59 of the blade. In particular, due to the inward force of the pressurized air (created by the structure of the housing and the glide plate member 44), clippings cut by the tip 54 are forced and conveyed inwardly and downwardly along an upwardly-turned lip 53 along the frontal portion of the blade arm 52, thus creating a mass of clippings at or adjacent the center 59 that are continually and repeatedly recut as the blade rotates and the mower is advanced in a forward direction. Thus as the blade rotates in high air pressure environment, the clippings are conveyed inwardly and at the same time evenly distributed into the soil area.

Referring now simultaneously to FIG. 5A, such inward conveyance and even distribution of the clippings is facilitated by the lip 53 and the diverter 58, as well as downwardly-turned lip or a "comb-like" structure 55 on the trailing edge of each arm. As the blade rotates, the downwardly-turned comb 55 along the trailing edge (along with the laterally directed air pressure) vibrates the tops of the cut stems to facilitate the downward movement or dislodging of the free clippings into the soil area. At the same time, the vibrated clippings are conveyed along the diverter 58 and collected into the mass. The diverter then directs the ultrafine clippings downwardly into the soil to create a fine mulch cut.

If desired, each of the tips 54 of the blade(s) can be located at different vertical positions to provide a stepped cutting action to further enhance mulching. Also, a murmur vibration unit 59 can be supported on or within the housing to vibrate the housing during mowing. Such a vibration unit further promotes the distribution of the cut grass clippings to soil level as well as the forward gliding and movement of the apparatus.

The mulching blade shown in FIGS. 5 and 5A provides significant advantages over the prior art. This blade creates a fine mulch cut by virtue of the S-shaped arms each having the preferred construction of FIG. 5A in which a leading edge of the blade forms a diverter and the trailing edge is a comb-like structure. The comb vibrates the cut clippings and the semicircular shape of the leading edge of the blade conveys the cuttings inwardly, where they are massed together and evenly distributed into the soil as the blade rotates and the mower is advanced. The resulting cut is a fine mulch as compared to the prior art, where mower blades sling or move the clippings outward rather than inward. Due to these significant advantages and useful functions which differ dramatically from the prior art, the disclosed mulching blade is, of course, useful in conventional wheeled mowers.

Figure 6:
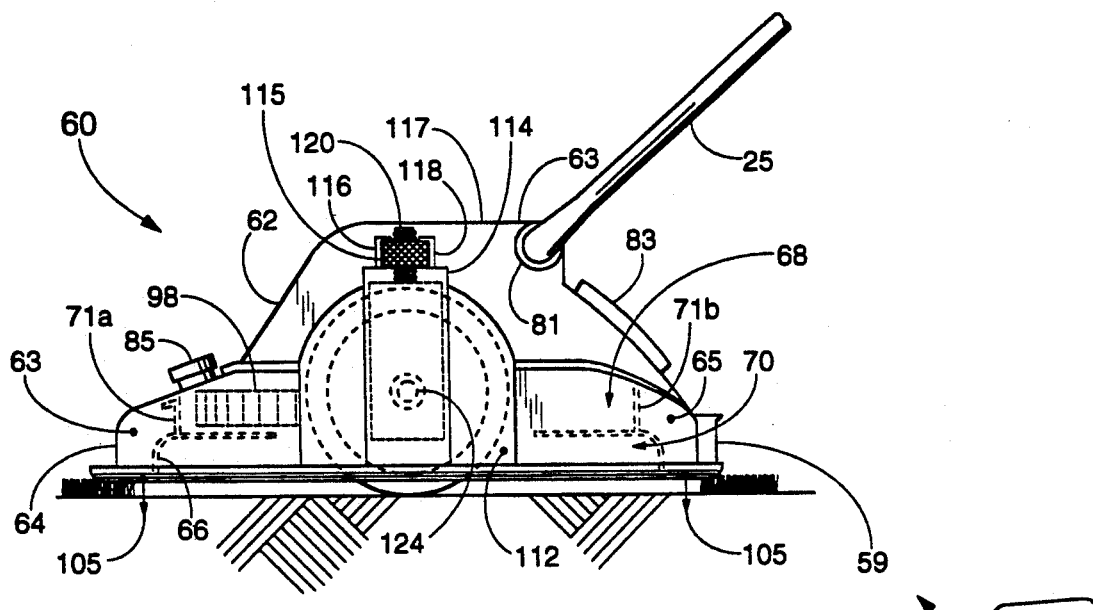
FIG. 6 is a side view, partially cutaway, of a first alternate embodiment of the invention.
Figure 7:
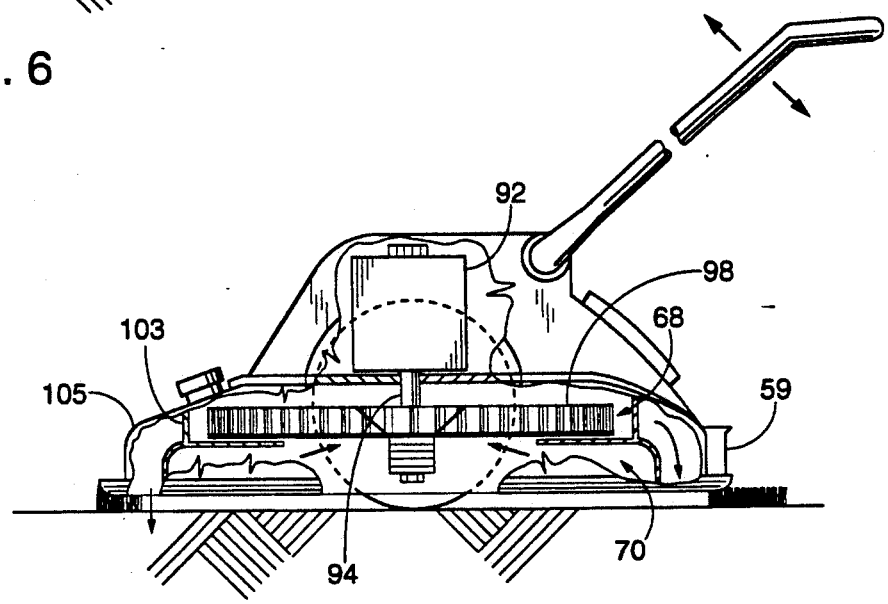
FIG. 7 is a detailed side view, partially cutaway, of the apparatus of FIG. 7.
Figure 9:
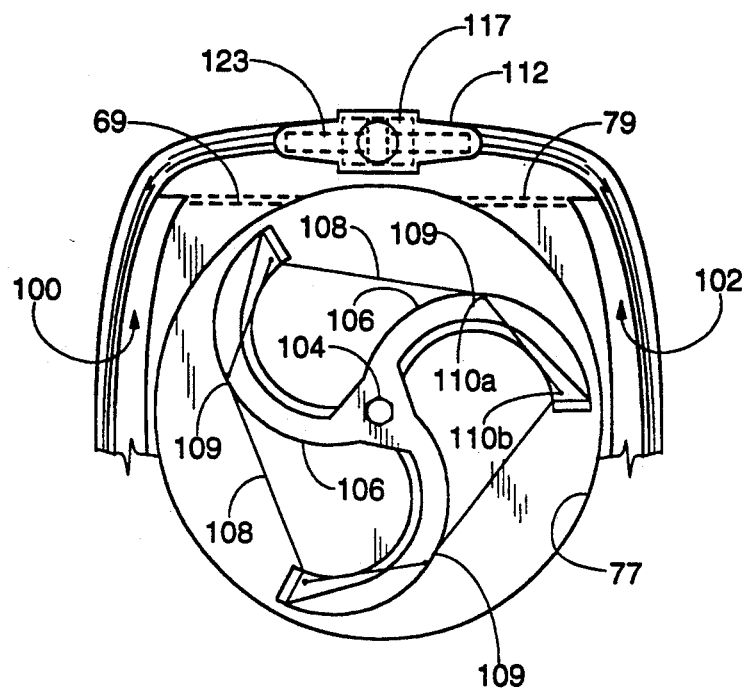
FIG. 9 is a bottom view of the apparatus of FIG. 7.

Referring now to FIGS. 6–7, an alternate embodiment of the invention is shown. In this embodiment, the air-floated apparatus 60 includes a housing 62 having motor enclosure 63, an outer shroud 64 and an inner frame 66, the outer shroud 64 substantially surrounding the inner frame 66 to define a pressure chamber 68 between the inner and outer shrouds and a vacuum chamber 70 within the inner frame. As best seen in FIG. 9, a vertical wall 69 of the inner frame extends longitudinally from front to back along each sides of the pressure chamber 68. In this embodiment, the wall 69 terminates in a forward end 71a and a rearward end 71b (best seen in FIG. 6). Accordingly, an airtight pressure chamber module 63 is formed along the frontal portion of the housing (between the outer shrouds and the frame) and an airtight pressure chamber module 65 is formed along the rear portion of the housing therebetween. A slot 100 underlies the frontal pressure module 63 and a slot 102 underlies the rear pressure module 65. Referring briefly to FIG. 9, the inner shroud includes a bottom opening 77 defined by an inner periphery of an integral plate member 79. The opening 77 is preferably circular.

The outer shroud is generally square or trapezoidal in shape and is preferably made of plastic material formed by an injection molding process to provide a lightweight housing. An air vent 83 is supported in the motor enclosure 63 for delivering air to cool the motor. A handle 25 is swivel-mounted to the housing in a pair of swivel joints, one of which is designated by the reference numeral 81. An impeller clean-out 85 is provided in the housing for receiving a water hose or the like. The clean-out 85 enables the impeller to be cleaned without overturning the apparatus and thus exposing the operator to the moving blade.

Referring to FIG. 7, the apparatus includes a drive mechanism that includes a motor 92 having a rotatable shaft 94. The motor 92 can be an AC or DC electric motor or, alternatively, a conventional lawn mower gasoline engine. A single impeller 98 is supported in an inverted or "vacuum-side" down manner in the pressure chamber 68 and rigidly secured to the shaft 94. The impeller 98 is preferably comprised of lightweight plastic material and may be formed by injection molding. The impeller rotates on the shaft 94 for drawing intake air from below the housing, for exhausting such air from the vacuum chamber 70 to create a vacuum in the chamber 70 sufficient to erect grass underlying the opening 77, and for lifting airborne cut grass clippings upward (through the vacuum chamber) into the high pressure chamber 68. Simultaneously, the air is pressurized in the pressure chamber 68 and driven into the ground through the airtight pressure chambers 63 and 65 along the front and back of the housing and the openings thereof.

In particular, and with reference also to FIGS. 6–7 and 9, the pressurized air is forced out from the pressure chamber 68, through the airtight chambers 63 and 65, and downward through the slots 100 and 102 to float the apparatus above the grass. This primary air flow is evidenced by the arrows 105. Cut grass clippings are drawn up to the pressure chamber 68 and through the chambers 63 and 65, and then forced back out of the apparatus through the slots 100 and 102 for recycle and recut as the mower advances. Thus the apparatus advantageously provides two distribution ports, namely the front and rear slots 100 and 102.

Not all clippings are vacuumed directly into the vacuum chamber during use. Some portion of the clippings are moved to ground level by a serpentine cutting blade 104 rotatable on the shaft and supported in a bottom opening 77 of the inner shroud as best seen in FIG. 9. The cutting blade preferably includes at includes at least three (3) arms 106 each of which has the diverter and upwardly-turned frontal edge construction described above with respect to FIG. 5. Of course, the cutting blade may include any number of cutting arms, with the larger number of blades serving to enhance the mulching operation. In this embodiment, however, each arm of the blade does not include the downwardly-turned comb 55 on its trailing edge; rather, a small diameter (e.g., 0.080 inch) nylon filament line 108 is supported across each pair of arms 106. In particular, the portions 109 of the filament line underlying the arms serve to vibrate the freshly-cut stems that have been cut to free those loose clippings in the stems and enable such free clippings to be conveyed downwardly (by gravity) to soil level. At the same time, the loose clippings are conveyed inwardly along the frontal portion of the rotating arm and are recut continually to create a fine mulch. The nylon line can be continuous as shown and is preferably strung through a pair of openings 110a and 110b in each arm 106. The line can, of course, span less than all of the pairs of arms if desired.

Thus, according to the invention the mulching blade effects multiple recutting and inward, downward conveyance of the clippings as the mower is advanced in the forward direction to achieve a fine mulch. As discussed previously, a murmur vibration unit can be used as well to enhance mulching.

Figure 8:
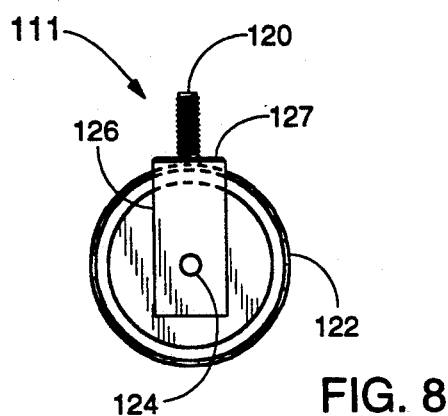
FIG. 8 is an elevation view of one of the wheel assemblies used in the apparatus of FIG. 7.

Referring now to FIGS. 6 and 8–9, the outer shroud 64 includes on each side thereof an integrally-formed, substantially airtight molded wheel enclosure 112. The enclosure 112 includes an upper portion 114 having first and second walls 116 and 118 for retaining a knurled knob 115 therein. An internal retaining surface 117 is located within the enclosure below the upper portion 114. Knurled knob 115 includes a central aperture in which is received a threaded shaft 120. In particular, and with reference now to FIG. 8 also, a wheel assembly 111 is supported in each molded enclosure 112 and includes a wheel 122. Wheel 122 is rotatably supported on shaft 124. An adjustment module 126 is attached to the shaft 124 and includes a top portion 127 overlying the upper portion of the wheel. The threaded shaft 120 is welded to the top 127 of the adjustment module 126 and is thus movable therewith. Rotation of the knurled knob 115 therefore varies the vertical position of the outer shroud 64 (and thus the housing, flotation means and cutting blade) relative to the wheel assembly 111 for varying the depth of cut. The adjustment module 126 fits within a channel raceway 123 of the wheel enclosure 112. In this manner, the depth of cut is adjustable.

In particular, it should be recalled that the horizontal cutting position is also varied by adding or removing the shaft spacers. Accordingly, "coarse" adjustments of the horizontal cutting position of the blade are effected by adjustment of the number of spacers, and such adjustment would normally take place at the beginning of the mowing season. Thereafter, more "fine" adjustments can be made to the horizontal cutting position by rotating the knurled knob. Such dual adjustment of the cutting position is extremely advantageous in that it provides the operator with increased flexibility and adaptability to changing conditions.

When flotation is initiated, the housing essentially "rocks" or pivots with respect to the wheel assembly to which it is attached (at the knurled knobs). The housing therefore automatically adjusts itself horizontal or, if necessary, conforms to the terrain even if portions of the housing were not initially level. Therefore, in the embodiment of FIGS. 1–5, the air-floated housing floats up into the fixed wheeled frame member. In the embodiment of FIGS. 6–9, however, the air-floated housing pivots on the fixed wheeled assembly. As noted above, in the latter embodiment depth of cut is "finely" adjusted before turning the machine on by varying the spacing between the top 127 (of the adjustment module 126) and the retaining surface 117.

Figure 10:
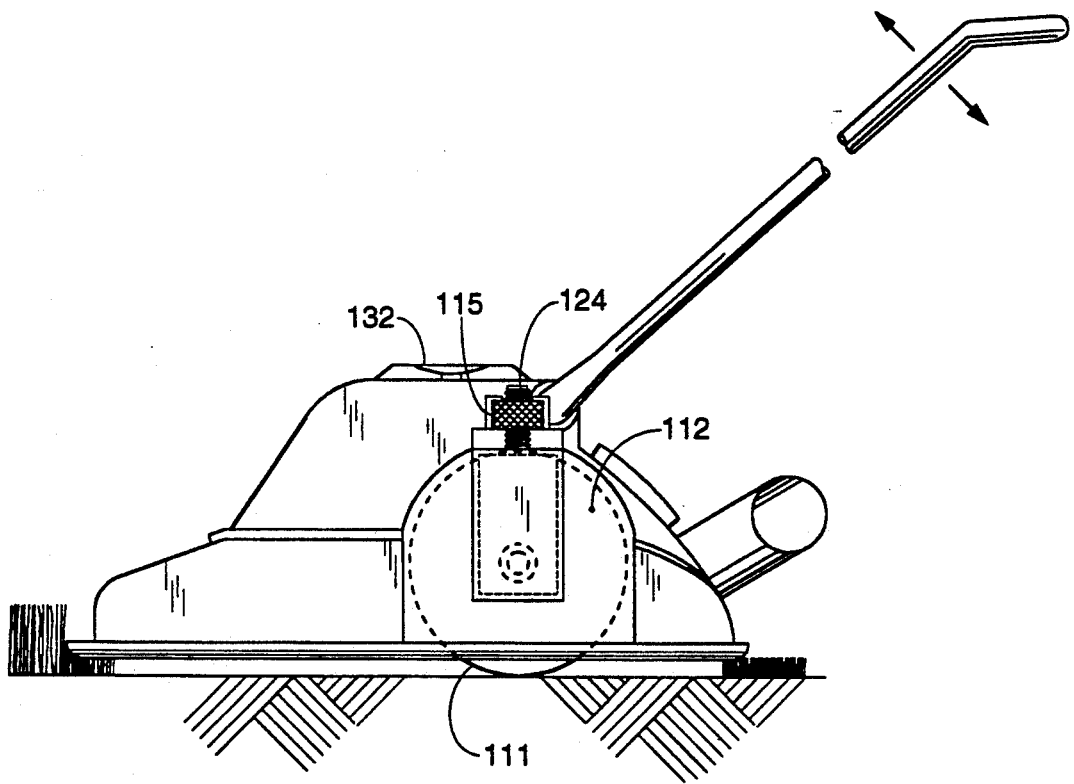
FIG. 10 is an alternate embodiment of the apparatus of FIGS. 6–7 with the wheel assembly located slightly aft of center-line.

Referring now to FIGS. 10–11, an alternate embodiment of the apparatus of FIGS. 6–9 is shown. In the embodiment of FIGS. 10–11, each wheel assembly 111 is located aft of center-line in an airtight enclosure 112 molded to the housing. The threaded shaft 120 cooperates with the knurled knob 115 to enable the varying of the depth of cut as previously described. Referring to FIG. 11, this apparatus differs from the mower of FIGS. 6–9, however, in that the plate 103 (of the inner frame) separating the pressure and vacuum chambers 68 and 70 extends all the way to the outer shroud 64 except along the frontal portion 130 of the housing. In particular, pressurized air is not directed downwardly between the shrouds along the back portion of the housing as in FIG. 9, and therefore the rear airtight pressure chamber 65 and the back slot 102 are not required. The pressurized air used to float or lift the housing is directed only along the frontal portion 130 of the housing through the airtight pressure chamber 63 and the slot 100.

It should further be appreciated that the amount of forward flotation is variable depending on the speed of the impeller 98. This is because the area of pressurized air is compressed to a small lift area or chamber. Accordingly, the apparatus of FIGS. 10–11 preferably includes a level module 132 affixed to the top of the housing above the motor. The level module 132 preferably includes a bubble level 133 or the like to indicate the relative levelness of the housing, which due to the forward flotation essentially "pivots" about the fixed wheel assemblies located aft of center-line. Alternatively, the knurled knob 115 may be provided with calibrated position lines showing the depth of cut for different levels indexed to show the desired depth associated with predetermined RPM settings readable from a digital readout.

The forward flotation provides directed lift along the frontal portion 130 of the housing. The cutting blade is preferably a mulching type as described with respect to FIG. 9. In this embodiment, cut grass clippings are vacuumed from the vacuum chamber 70 into the pressure chamber 68 and forced out the frontal slot 100 for recut. A portion of the clippings are also centrifuged around the pressure chamber 68 and delivered to the discharge port 134. A 90 degree elbow conduit 136 may be attached to the port 134 if desired to direct the clippings from the high pressure delivery port 134 to be distributed over a wide area. Alternatively, the conduit 136 is attached to a grass catching bag supported on the handle. Of course, the discharge port 134 can be sealed for mulching operation.

Referring now to FIG. 12, an air-floated vacuum cleaner 140 is shown which incorporates the principles of the present invention. As in the embodiment of FIGS. 6–9, a center-line wheel assembly is provided at opposite sides of the housing, although it should be appreciated that the aft positioning shown in FIGS. 10–11 is also acceptable. Of course, the cutting blade is omitted in this embodiment. As in the apparatus shown in FIGS. 10–11, however, the plate 103 separating the pressure and vacuum chambers 68 and 70 extends all the way to the outer shroud 64 except along the frontal portion 130 of the housing. In particular, pressurized air is not directed downwardly between the shrouds along the back portion of the housing. The pressurized air used to float the housing is directed only along the frontal portion 130 of the housing through the slot 100. Rearward support of the housing is provided by the wheel assembly located along or aft of center-line.

With the arrangement shown in FIG. 12, dust and other debris on the underlying surface are vacuumed into the vacuum chamber 70 and drawn into the pressure chamber 68. Such material is then directed forcibly out toward either the frontal slot 100 or a discharge port 142. A flexible "bellows" conduit 144 is attached between the port 142 and a collection bag 146 supported on the handle 25 to collect the dust and debris in the bag. Material directed toward the frontal slot is captured by the removable air filter 148 supported in the slot 150 along the frontal portion of the housing. Any material that escapes through the filter is recycled as the vacuum is advanced. The filter 148 can be omitted if desired because forward movement of the vacuum recycles the material under the vacuum chamber.

If desired, the vacuum cleaner may include an air freshener module 143 attached to the housing for supporting powdered air freshener material. A small venturi-type valve 145 connects the module 143 to the pressure chamber 68 to enable the powdered air freshener to be suctioned into the chamber for delivery into the carpet.

Figure 13:
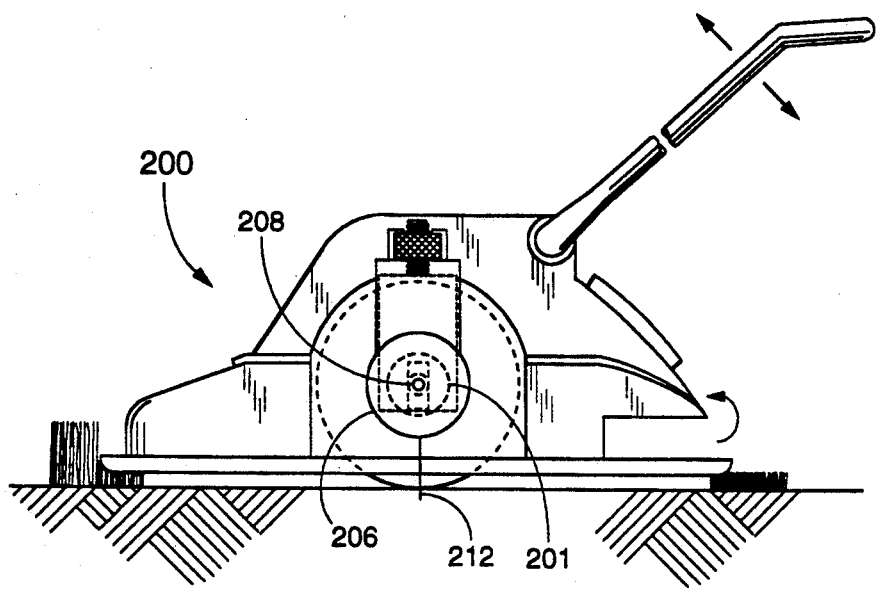
FIG. 13 is an elevational view of another embodiment of the invention wherein the air-floated wheeled apparatus includes an edger and a trimmer.
Figure 14:
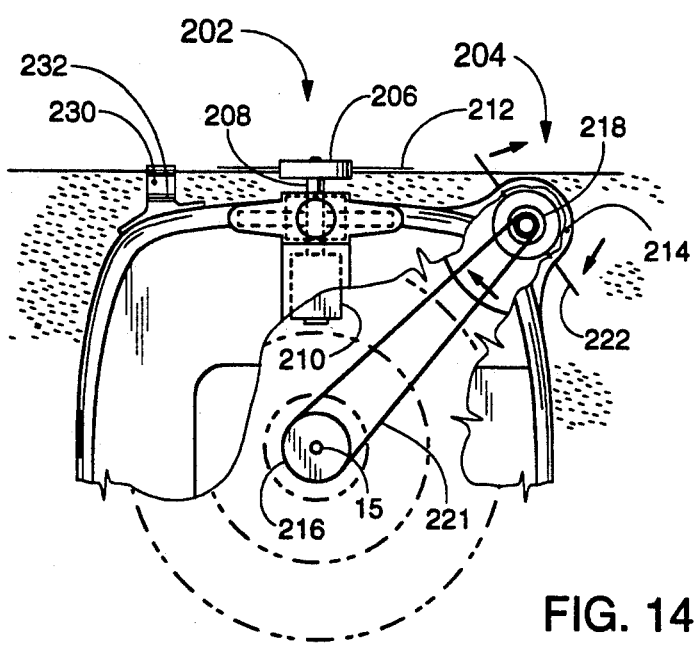
FIG. 14 is a plan view, partially cutaway, of the air-floated wheeled apparatus of FIG. 13.

Referring now to FIGS. 13–14, elevational and plan views are shown of another alternate embodiment of the invention wherein an air-floated center-line wheeled apparatus 200 includes an edger 202 and a trimmer 204. The edger 202 includes a nylon spool module 206 attached to a shaft 124, which is driven by an auxiliary D.C. motor 210. The spool module 206 preferably includes a wound nylon filament line 212; alternatively, the module 206 may support a plurality of such lines threaded into the module as is known in the prior art. In the preferred embodiment, the shaft 124 is not used to rotate the wheel 122 as described above with respect to FIGS. 8-9; rather, the wheel rotates into its own bearing 201, and the shaft 124 is received in the bearing. In other words, the motor 210 rotates the shaft 124 to drive the edger spool module 206 while the associated wheel 122 rotates on its attached bearing 201. This arrangement is also envisioned for use in a conventional wheeled mower wherein one of the conventional wheels thereof is replaced with the wheel 122/bearing 201 construction and wherein the edger spool module is then driven by the shaft 124 received therein. In such arrangement, it may also be desirable to include the molded wheel enclosures 112 as described above.

Figure 15:
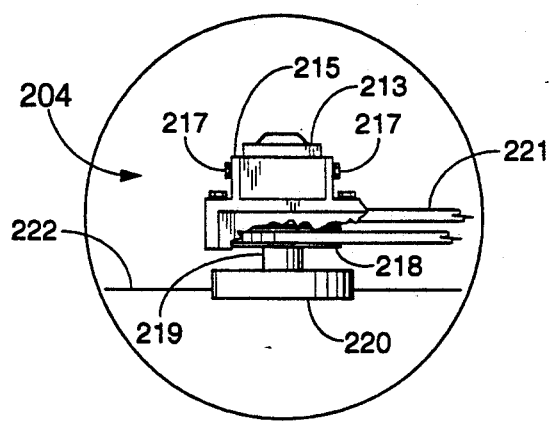
FIG. 15 is a detailed view of the trimmer assembly of the apparatus of FIG. 13.

Referring now to FIGS. 14-15, The trimmer elements are generally disposed within an trimmer pod 214 preferably located adjacent one of the aft corners of the housing. The trimmer is driven by the main shaft 15 through a set of pulleys and a drive belt mechanism. In particular, and with reference to FIGS. 14-15, a first pulley 216 is mounted for common rotation with the impeller on the shaft 15. Pulley 216 is connected to a second pulley 218 by means of an o-ring type belt 221. Second pulley 218 is supported in the trimmer pod on shaft 219 and has attached thereto a trimmer module 220. Trimmer module 220 supports a cutting element 222, which may be a flexible line or blade(s). To obtain a high speed of rotation, preferably the pulley 216 is 3" in diameter and the pulley 218 is 1" in diameter such that when the main shaft is rotating at 4000 rpm, the pulley 218 is rotating at 12,000 rpm.

As best seen in FIG. 15, the second pulley 218 is attached to a bearing 213 which in turn is supported for up or down movement within a bearing housing 215 of the trimmer. By loosening the set bolts 217, the bearing 213 and thus the second pulley 218 and trimmer module 220 are vertically adjustable to enable the operator to set the line trimmer at an exact mowing plane relative to the mowing blade. Moreover, it should further be appreciated that other suitable drive mechanisms besides the belt 221 are also envisioned by the invention. For example, the trimmer can be interfaced to the main shaft by a flexible shaft mechanism. It is also envisioned that other types of trimmer mechanisms, such as shown in U.S. Pat. Nos. 4,107,841, 4,249,311 and 4,270,271 are useful in the combined mower/trimmer/edger shown in As also seen in FIG. 14, the apparatus may also include a guide 230 for aligning the edger and trimmer. The guide 230 has a spring-loaded torque hinge 232. If desired, a suitable cable mechanism can be affixed to the hinge to enable the operator to remotely engage or disengage the guide.

The combination of a mower, trimmer and edger as described in FIGS. 13-15 is particularly advantageous and enables the operator to provide significantly improved lawn care as compared to the prior art. Of course, it is readily clear that by combining these diverse mechanisms into a single unit, there is no longer the need to purchase, store and maintain multiple products. Moreover, the apparatus can be used to simultaneously mow, trim and edge a lawn, thereby significantly reducing the overall time necessary to care for the lawn. If desired, the trimming and edging and take place sequentially as opposed to simultaneously.

It should be appreciated by those skilled in the art that the specific embodiments disclosed above may be readily utilized as a basis for modifying or designing other structures for carrying out the same purposes of the present invention. It should further be realized by those skilled in the art that such equivalent constructions do not depart from the spirit and scope of the invention as set forth in the appended claims.

What is claimed is:

1. An apparatus, comprising:
    a housing including an impeller for establishing an air cushion to float the housing above a support surface, the housing having a predetermined center-line;
    a wheel assembly having at least first and second wheels contacting the support surface, the wheel assembly positioned over a portion of the housing and oriented along the predetermined center-line; and
    means supported by the housing and the wheel assembly to enable the housing to be carried by the wheel assembly when the impeller is not activated to float the housing and to enable the housing to float up into the wheel assembly when the impeller is activated to float the housing.

2. The apparatus as described in claim 1 wherein the housing has a center-line and the wheel assembly is located along the center-line of the housing.

3. The apparatus as described in claim 1 wherein the housing has an outer shroud and an inner shroud, the outer shroud surrounding a predetermined portion of the inner shroud to define a pressure chamber between the inner and outer shrouds and a vacuum chamber within the inner shroud, the inner shroud having a bottom opening.

4. The apparatus as described in claim 3 wherein the means for establishing an air cushion comprises:
    a motor including a rotatable shaft; and
    an impeller supported in the pressure chamber and rotatable on the shaft for exhausting air from the vacuum chamber while simultaneously pressurizing air in the pressure chamber for flotation of the apparatus.

5. The apparatus as described in claim 4 further including a cutting blade rotatable on the shaft and supported in the opening of the inner shroud.

6. The apparatus as described in claim 6 wherein the cutting blade has at least one semicircular-shaped cutting arm, the arm having a forward cutting tip, an upwardly-turned lip along its leading edge and a downwardly-turned lip along its trailing edge for directing cut grass clippings inward and downward into the support surface.

7. The apparatus as described in claim 5 further including three semicircular-shaped cutting arms, each of said arms projecting outward from a central point to form a serpentine configuration.

8. The apparatus as described in claim 7 wherein each of such cutting arms includes a removable and replaceable cutting tip.

9. The apparatus as described in claim 6 further including a glide plate member underlying the housing.

10. The apparatus as described in claim 9 wherein the glide plate member has a slot along the frontal portion of the housing.

11. The apparatus as described in claim 9 wherein the glide plate member has a plurality of air ports located in corner regions of the guide plate member.

12. The apparatus as described in claim 11 wherein the glide plate member further includes at least one arcuate slot located between a pair of said air ports.

13. In an air-floated apparatus having a housing and means for establishing an air cushion to float the housing above a support surface, the housing having a predetermined center-line, the improvement comprising:
- a wheel assembly having first and second wheels contacting the support surface, the wheel assembly oriented substantially along the predetermined center-line with the housing supported for relative vertical movement with respect to the wheel assembly.

14. In the air-floated apparatus as described in claim 13 further including a handle rigidly affixed to the housing, the handle having first and second arms each having a spring means for enabling the handle to be flexed about the spring means.

15. In the air-floated apparatus as described in claim 13 further including a glide plate member underlying the housing, the glide plate member having a plurality of air ports located at corner portions thereof, and a plurality of arcuate slots with; each slot located between a pair of said air ports.

* * * * *